US005429091A

United States Patent [19]

Huber et al.

[11] Patent Number: 5,429,091

[45] Date of Patent: Jul. 4, 1995

[54] METHOD AND ARRANGEMENT FOR CONTROLLING AN INTERNAL COMBUSTION ENGINE

[75] Inventors: Werner Huber, Schwaikheim; Martin Streib, Vaihingen; Thomas Zeller, Ditzingen; Dieter Sorg, Gemmingen, all of Germany

[73] Assignee: Robert Bosch GmbH, Stuttgart, Germany

[21] Appl. No.: 189,514

[22] Filed: Jan. 31, 1994

[30] Foreign Application Priority Data

Jan. 29, 1993 [DE] Germany ........................ 43 02 483.1

[51] Int. Cl.[6] ...................... B60K 26/00; F02D 41/04; F02D 41/22; F02D 45/00

[52] U.S. Cl. .................................................... 123/399

[58] Field of Search ................ 123/361, 396, 399, 403

[56] References Cited

U.S. PATENT DOCUMENTS

| | | | |
|---|---|---|---|
| 4,603,675 | 8/1986 | Junginger et al. | 123/478 |
| 4,881,227 | 11/1989 | Bühren | 371/1 |
| 5,115,396 | 5/1992 | Keegan | 123/399 |
| 5,233,958 | 8/1993 | Knoss et al. | 123/399 |
| 5,293,852 | 3/1993 | Lehner et al. | 123/399 |
| 5,325,832 | 7/1994 | Maute et al. | 123/399 |
| 5,339,782 | 8/1994 | Golzer et al. | 123/399 |
| 5,370,094 | 12/1994 | Sorg et al. | 123/399 |

*Primary Examiner*—Willis R. Wolfe
*Attorney, Agent, or Firm*—Walter Ottesen

[57] ABSTRACT

The invention is directed to a method and an arrangement for controlling an internal combustion engine wherein a signal representing engine load is compared to a maximum value pregiven for at least one driver command range. Fault and emergency reactions are initiated when the measured signal value reaches or exceeds the maximum value.

11 Claims, 3 Drawing Sheets

METHOD AND ARRANGEMENT FOR CONTROLLING AN INTERNAL COMBUSTION ENGINE

BACKGROUND OF THE INVENTION

Measuring devices for detecting operating variables of an internal combustion engine and/or of the motor vehicle are widely used in modern control systems for engines. The measuring signals of the measuring devices form the basis for the control of the engine. Computing elements are also used for carrying out the control function. Unwanted operating conditions of the engine can result because of faults in the area of the measuring devices and/or of the computer elements. For this reason, the necessity is present for monitoring the operation of the measuring devices and/or of the computing elements. Such a check is especially significant for electronic motor power control systems (electronic accelerator pedal systems) wherein the power of the engine and therefore the speed and acceleration of the motor vehicle is controlled on the basis of signals from position transducers of an operator-controlled element and, if required, of a power transducer element by means of at least one computing element. For this reason, various methods for monitoring the position transducer and the computing elements have been suggested in the past. For example, U.S. Pat. No. 4,603,675 discloses that a second position transducer can be provided and a fault measure is initiated when the signal values of the two position transducers deviate from each other by a pregiven tolerance range. Furthermore, for monitoring the control loop or the computer function, the difference between the position of the operator-actuated element and the position of the power actuating element of the engine can be checked for an impermissible deviation. U.S. Pat. No. 4,881,227 discloses that two completely redundant computers can be provided which mutually monitor each other with the aid of the data exchange and with the aid of watchdog signals.

These measures can ensure a comprehensive operational reliability of such a system but lead to increased complexity because of the comprehensive monitoring and, in extreme cases, can lead to fault announcements which are unwanted because they are unnecessary.

SUMMARY OF THE INVENTION

In view of the above, it is an object of the invention to configure the monitoring of a control system of an internal combustion engine so that it is somewhat simpler and without diminishing the operational reliability.

This is achieved in that in selected ranges of the driver command, a signal representing the engine load is compared to a maximum value pregiven for this range of the driver command and a fault announcement or emergency measure is initiated when the maximum value is reached or exceeded. The driver command is pregiven by the operator-actuated element when actuated by the driver.

The invention makes a simple monitoring function available which ensures the operational reliability of the control system without requiring significant complexity.

It is especially advantageous that the monitoring measures provided by the invention enable the possibly difficult operating states of unwanted acceleration of the motor vehicle to be detected and permit this unwanted acceleration to be countered by suitable measures.

Slight deviations are not considered.

The load signal is used to form the injection pulse and is determined on the basis of air quantity, air mass or intake pressure. The use of the load signal is especially advantageous and the maximum value thereof can be determined in predetermined ranges of the operator command while considering the various operating conditions such as the following: up-hill driving, load, influence of the idle speed control, et cetera.

The direct use of the air quantity, air mass or intake pressure can also be advantageous in other embodiments.

An especially advantageous embodiment provides that the monitoring of the invention is applied to an idle command of the driver, that is, in idle or in overrun operation. The idle control is especially to be considered when determining the maximum value.

By means of suitable fault measures, fault conditions in the area of the position transducer of the power-determining element or in the area of the computing element for carrying out the control of the power-determining element can be detected and intercepted. Suitable fault measures include, for example, switching off the output stage for the control of the power-determining element, initiating the safety cutoff of fuel above a pregiven rpm threshold or limiting the road speed, engine speed or acceleration.

The method and arrangement of the invention can be utilized in various configurations of the control apparatus of an internal combustion engine.

The application is advantageous for an electronic accelerator pedal system having function and monitoring computing elements. The monitoring is carried out in an advantageous manner in the monitoring computing element and, when a fault is detected in the fuel injection, this monitoring computing element can intervene in the output stage of the electronic accelerator pedal system or in the function computing element in the sense of an emergency function. Here, the signal representing the load is transmitted by the computing element determining the fuel metering via an interface.

In addition, the method and arrangement of the invention can be utilized when the electronic accelerator pedal system includes only a function computer and the monitoring is carried out in the computing element of the fuel metering (Motronic). In this case, an interface for transmitting the load signal can be omitted in an advantageous manner.

The application of the method and arrangement of the invention can also be advantageous when the total system comprises a function computing element and a monitoring computing element. The function computing element controls the power-determining element as well as the fuel injection and, if required, the ignition. A further improvement of the monitoring can be obtained in an advantageous manner when the signal representing the load is additionally processed in the monitoring computing element at least in the driver command ranges which are to be monitored.

In all configurations, the driver command can be determined independently in the function computing element and in the monitoring computing element on the basis of the signals of only one position transducer or on the basis of the signals of two position transducers.

A further advantageous embodiment of the method and arrangement of the invention permits carrying out the method in various driver command ranges at least in the lower part-load range while considering the gear ratio and, if required, the road speed. For each driver command range (position range of the accelerator pedal) below a predetermined road speed, a maximum load value can be determined in dependence upon the actual gear ratio and can be applied for monitoring.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
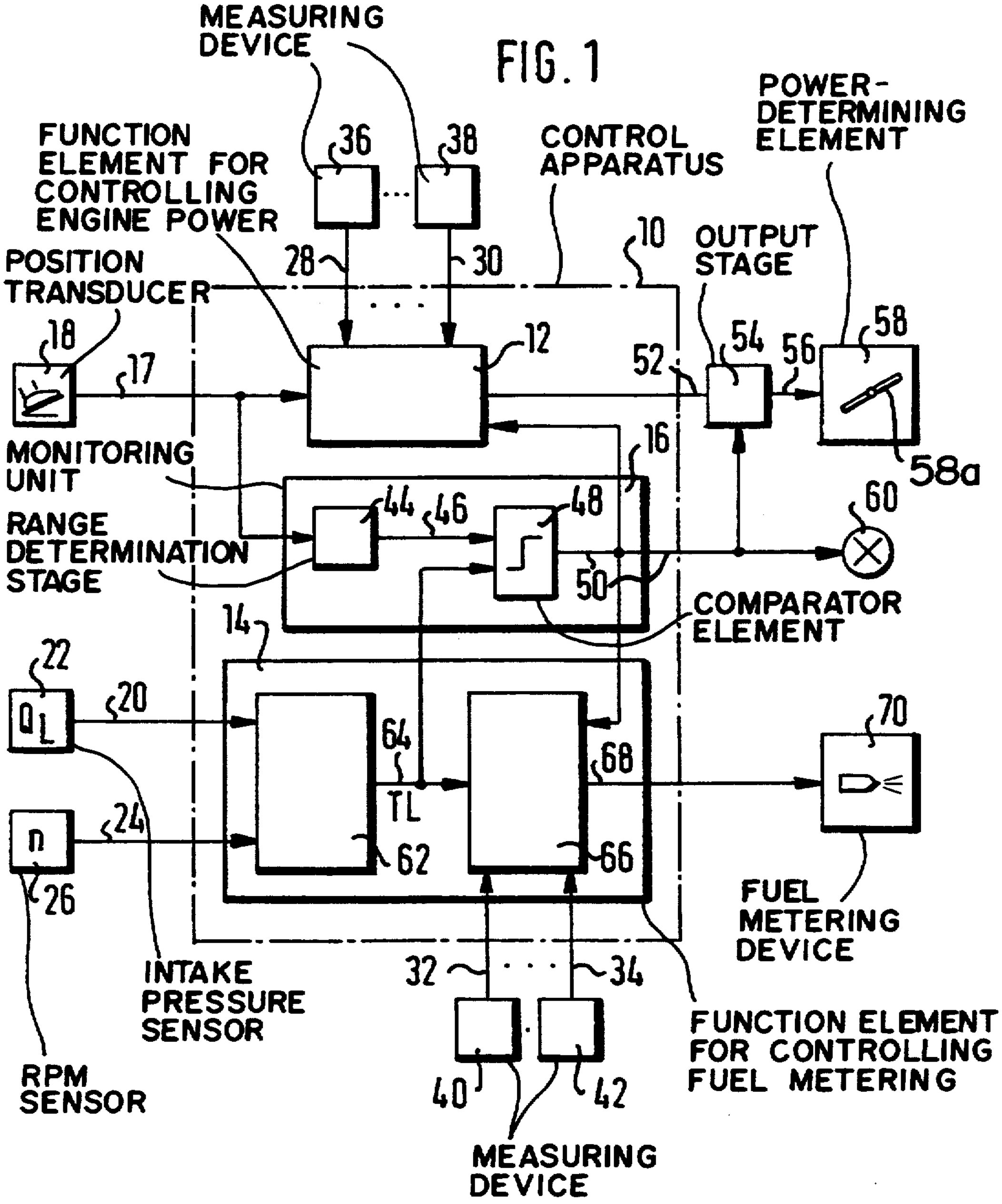
FIG. 1 is an overview block circuit diagram of an arrangement of the invention for carrying out the method of the invention.

FIG. 1 shows a control apparatus 10 which essentially includes function element 12 for electronically controlling the power of the engine, function element 14 for controlling the quantity of fuel to be metered and, if required, the ignition time point and, function element 16 for monitoring the function element 12.

Furthermore, the control arrangement 10 can include additional function elements such as transmission control, ABS, ASR/MSR, idle control, exhaust gas feedback, charging pressure control and the like. However, these function elements are not shown in FIG. 1 for the sake of clarity.

The following are connected to the control apparatus 10: the input line 17 from a position transducer 18 for determining the driver command, the input line 20 of an air-mass sensor, an air-quantity sensor or an intake pressure sensor 22; and, the input line 24 from an engine rpm sensor 26. In addition, input lines 28 to 30 as well as 32 to 34 are provided which connect the control apparatus 10 to measuring devices 36 to 38, respectively, and measuring devices 40 to 42, respectively. These measuring devices detect additional operating variables of the engine and/or motor vehicle, which are important for carrying out the control tasks. In modern control apparatus, the input line and the output lines are taken together in a common bus system (for example, CAN) and connected to each computing element.

In the overview circuit block diagram, the input line 17 is connected to the function element 12 to which, in turn, the input lines 28 to 30 are connected. In addition, the input line 17 is connected to the monitoring unit 16 and is there preferably connected to a range determination stage 44. The range determination stage 44 is connected via the line 46 to the comparator element 48 and the output line 50 of the latter is connected, on the one hand, to function element 12 and, on the other hand, to function element 14. The output line 50 also defines an output line of the control apparatus 10. A further output line 52 connects the function element 12 to the output stage 54. The output stage 54 can also be a component of the control apparatus and the output line 56 of the output stage 54 is connected to the power-determining element 58 which is to be controlled. In one advantageous embodiment, the line 50 is connected to the output stage 54 and to a display device 60.

The input lines 20 and 24 are connected to the function element 14 and from there to a detecting unit 62 for the load signal TL. The load signal TL is supplied from the detecting unit 62, on the one hand, via the line 64 to the monitoring unit 16 where it is supplied to the comparator element 48 and, on the other hand, to the fuel-metering unit 66. Input lines 32 to 34 are connected to the fuel-metering unit 66 and, in an advantageous embodiment, the output line 50 of the comparator element 48 of the monitoring unit 16 is likewise connected to the fuel-metering unit 66. The output line 68 of the fuel-metering unit 66 defines a further output line of the control apparatus 10 and is connected to the device or devices 70 for metering fuel.

Two measuring units 18 for detecting the driver command are provided in advantageous embodiments. The first measuring unit is connected to the element 12 while the second measuring device is connected to the monitoring unit 16. Furthermore, the element 14 can include means (not shown) for setting the ignition time point.

The line 20 can be connected to the monitoring unit 16 in lieu of the line 64 in other advantageous embodiments of the invention which are in addition to the embodiment shown in FIG. 1.

In an additional advantageous embodiment, the lines 20 and 24 as well as selected lines 28 to 30 for transmitting gear ratios and/or road speed can be connected to the monitoring unit 16 for monitoring purposes.

The operation of the arrangement shown in FIG. 1 will now be described.

The driver command is detected by the accelerator pedal position transducer 18 and is transmitted via line 17 to element 12 for carrying out the electronic engine power control. Element 12 forms a drive signal for the actuating motor of the power-determining unit 58 on the basis of the driver command and, if required, on the basis of additional operating variables supplied via lines 28 to 30. The power-determining unit 58 includes a power-determining element in the form of the throttle flap **58*a* of an internal combustion engine and is arranged in the air-intake system. The actuating motor of the power-determining unit 58 can be a direct-current motor, step motor or a rotation actuator. The drive of the actuating motor is transmitted via the line 52, output stage 54 as well as the line 56. The known systems for electronic engine power control preferably operate in the context of a position control wherein the position of the power-determining element 58*a* is controlled to the position value pregiven by the accelerator pedal transducer 18. In this way, preferably one of the measuring devices 36 to 38 is a position transducer for the power-determining element 58*a*. Furthermore, in preferred embodiments, operating variables can be supplied via the lines 28 to 30. These operating variables include: drive slip control signals or engine drag torque control intervention signals, an intervention signal from a road speed controller or an idle speed controller, engine speed, engine temperature, road speed, gear ratio, et cetera. The corresponding systems or measuring devices are represented by the blocks 36 to 38**.

The computing unit 62 of the fuel-metering unit 14 computes by division the base load signal or the base injection time TL in dependence upon the air quantity or air mass or intake underpressure and in dependence upon the actual engine speed. The air quantity, air mass or intake underpressure are determined by the measuring unit 22 and supplied via the line 20. The actual engine speed is determined by the measuring unit 26 and is transmitted via the line 24. This load signal is corrected in the fuel-metering element 66 in dependence upon the additional operating variables supplied via the lines 32 to 34. The load signal is outputted via the line 68 to the fuel-metering unit 70. Additional operating variables can include, for example, engine temperature, battery voltage, exhaust gas composition, crankshaft angle, et cetera. In addition, the element 66 includes means for carrying out the fuel cutoff function.

The monitoring unit 16 is provided for monitoring the system function. The procedure provided by the invention is shown in block format and is carried out within monitoring unit 16. This is in addition to additional monitoring measures as may be required. The position value of the accelerator pedal 18 is supplied to a range decision element 44. There, in the simplest case, a determination is made as to whether the driver command "idle" is present, that is, whether the accelerator pedal has been released. In this case, the corresponding maximum value of the load signal is outputted via the line 46 to the comparator element 48.

In a further advantageous embodiment, the element 44 includes a table which, at least in the mid and lower part-load range, assigns respective maximum load values to position ranges of the accelerator pedal 18 while considering the actual transmission ratio (for example, while evaluating the road speed below a pregiven road speed threshold or engine rpm). In this way, an improved monitoring of the system function even outside of idle and overrun operations is possible.

The comparator element 48 compares the actual load value on the line 46 to the pregiven maximum value. An appropriate signal is outputted via the line 50 when the actual load value reaches or exceeds the maximum value. This signal leads to the following in dependence upon the particular application: to a switchoff of the output stage 54, to a fault indication 60, to a cutoff of the fuel metering above a rpm threshold, to an inactivation of the electronic engine power control 12 or to a limitation of its function, to a limitation of rpm or a limitation of road speed.

The block circuit diagram of FIG. 1 includes as essential elements the engine power control 12, the fuel metering 14 as well as the monitoring element 16. These elements can, in a control apparatus, be distributed to several computer elements. In conventional systems, the fuel-metering element 14 is assigned its own control apparatus (Motronic); whereas, the engine power control 12 is realized in a first computer and the monitoring unit 16 is realized in a second computer of an accelerator pedal control apparatus. The actual load values are transmitted via a corresponding interface between fuel-metering unit 14 and the electronic engine power control (12 and 16). If required, the fuel shutoff above a predetermined engine rpm is activated by the engine power control via a further interface between the two computer elements in the case of a fault.

In a further advantageous system, the monitoring unit 16 can be integrated into a computer element in the fuel-metering element 14. This affords the advantage that the above-described interfaces can be omitted.

In addition, and in an advantageous manner, a system configuration can be selected wherein the engine power control element 16 and the fuel-metering element 14 are combined in a computer unit; whereas, the monitoring element 16 defines a second computer element. In this case, the monitoring element can include means for an expanded examination of the actual load signal at least in the idle state.

Two embodiments of the method of the invention are explained with reference to the flowcharts of FIGS. 2 and 3 which are executed in monitoring element 16.

Figure 2:
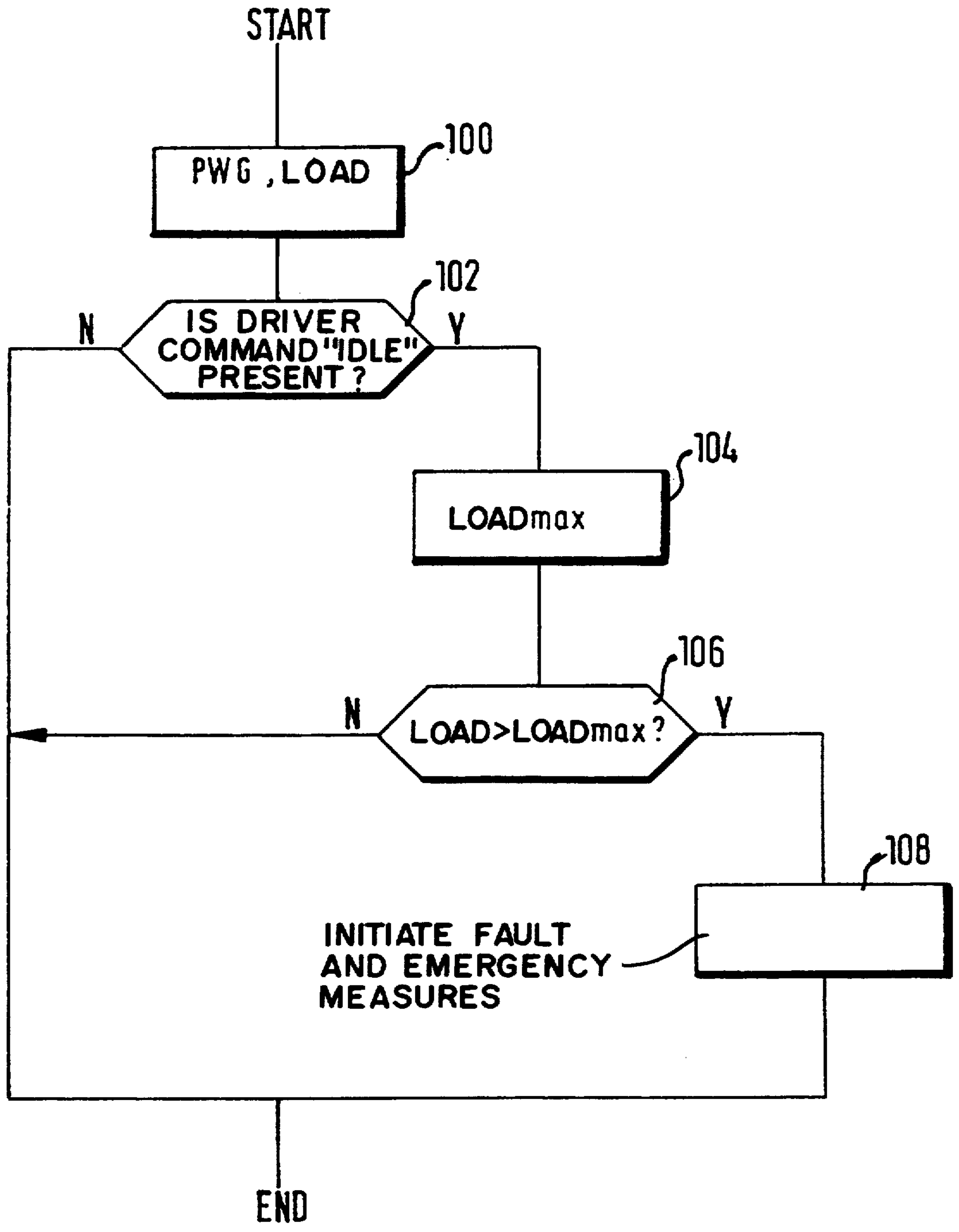
FIG. 2 is a flowchart showing a first embodiment of the method of the invention in the context of a computer program; and, FIG. 3 is a second embodiment of the method of the invention also in the context of a computer program.

After the start of the subprogram of FIG. 2, the position value PWG of the accelerator pedal position transducer 18 as well as the actual load value LOAD are read-in in a first step 100 and in the next inquiry step 102, a check is made as to whether the driver command "idle" is present, that is, whether the accelerator pedal is released. If this is not the case, the subprogram is ended and repeated at a pregiven time. If there is a positive result in step 104, the maximum value LOADmax of the load signal, which is assigned to the idle state, is read in and in the next step 106, the actual load value is compared to the maximum value. If the maximum value is exceeded, then fault and emergency measures or a fault display for diagnostic purposes as described above are initiated in accordance with step 108. Thereafter, the subprogram is ended and repeated at a pregiven time; whereas, if the opposite result is present, the subprogram is ended without fault measure.

Figure 3:
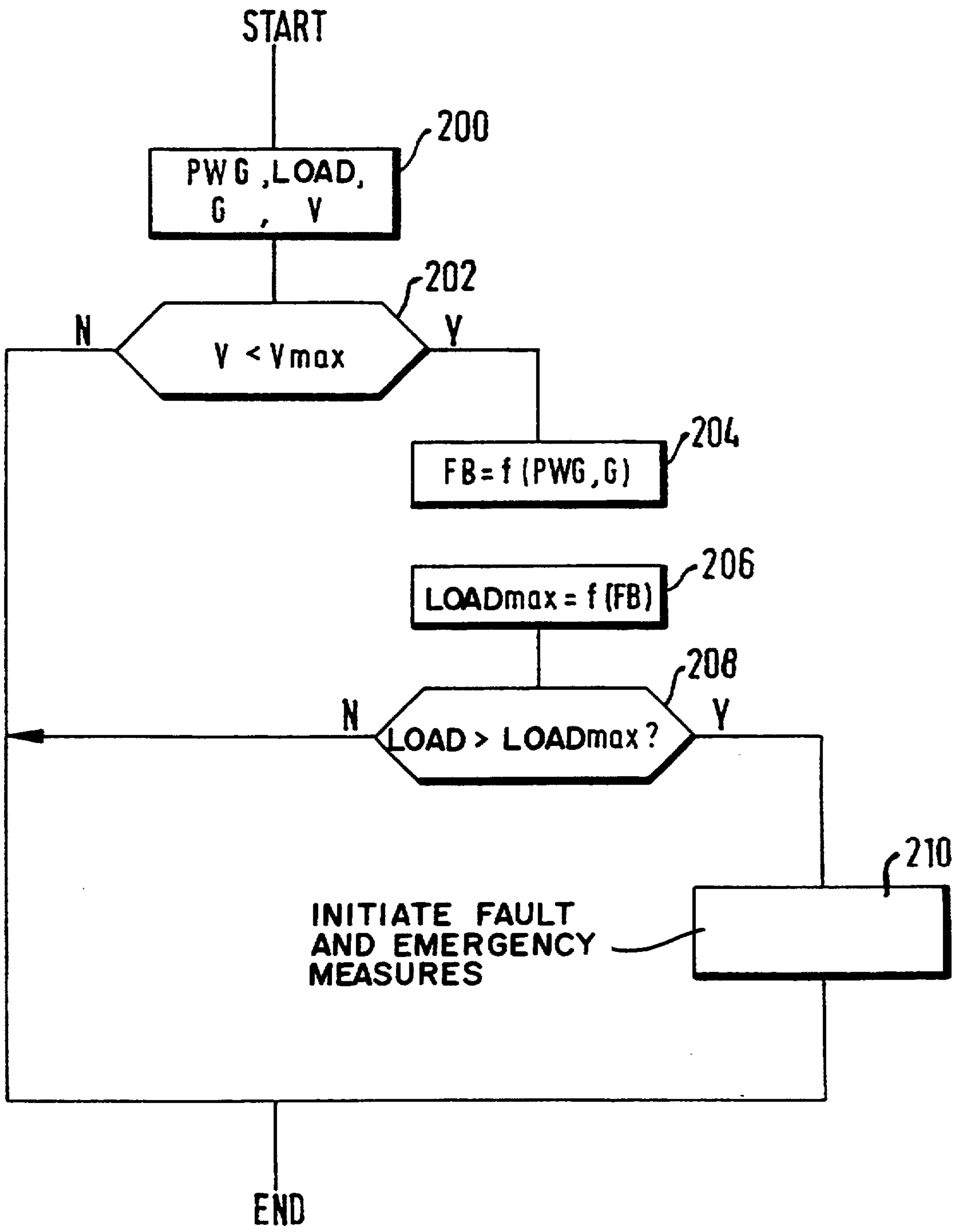

The embodiment of FIG. 3 distinguishes from that shown in FIG. 2 in that not only is the idle range monitored but various driver command ranges are monitored.

Referring to FIG. 3 and after the start of the subprogram, the following are read-in in step 200: the driver command value PWG, the actual load value LOAD, preferably gear ratio G, and road speed V. In the next step 202, a determination is made as to whether an operating state is present for a purposeful execution of the monitoring to be described below. This can, for example, take place on the basis of the road speed V of the motor vehicle in that a check is made as to whether there is a drop below a pregiven limit value Vmax. This is to be selected in the manner that an operating range is limited within which the assignment of maximum load value to the driver command range (while considering gear ratio) can take place with a view to the desired monitoring.

If the answer in step 202 is such that no monitoring is carried out, then the subprogram is ended and repeated at a pregiven time. Otherwise, various driver command ranges FB are determined on the basis of the measured driver command PWG, while taking into account the gear ratio G in accordance with step 204. This can, for example, be the idle range when the accelerator pedal is released or can be a lower part-load range when the accelerator pedal (actuated to a specific angle) is for the particular gear ratio into which the transmission has been shifted or this can be a mid part-load range for an intermediate displacement of the accelerator pedal for the particular gear ratio. After determining the driver command ranges, the maximum possible load value LOADmax is read out from a table in the next step 206 for the driver command range which is present and, in the inquiry step 208, the measured load value LOAD is compared to the maximum load value LOADmax. If the actual load value drops below the maximum load value, then the subprogram is ended without further measure; whereas, when the actual load value reaches the maximum load value or exceeds the same, then in accordance with step 210, emergency measures or fault measures follow and the subprogram is thereafter ended.

As mentioned above, these fault measures can include a fault indication for diagnostic purposes, a switchoff of the output stage of the power-determining element, a forced fuel cutoff above a specific rpm, a limitation of the road speed or the engine speed, et cetera.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine equipped with means for detecting a driver command and with a power-determining element, the method comprising the steps of:

adjusting the power of the engine by adjusting the power-determining element on the basis of the driver command;

forming a signal representative of the load of the engine;

providing a maximum value of said signal for at least one range of said driver command;

measuring said signal; and, initiating fault and/or emergency measures when the measured value of said signal is equal to or greater than said maximum value.

2. The method of claim 1, wherein the driver command is detected by at least one position transducer for detecting the position of an operator-actuated element actuated by the driver.

3. The method of claim 2, wherein said signal is determined on the basis of the engine speed as well as the signal of a sensor measuring air mass, air quantity or intake pressure.

4. The method of claim 1, wherein said one range of said driver command is represented by a released accelerator pedal and the maximum possible load value is compared to the actual load value when the idle command of the driver is detected.

5. The method of claim 1, comprising the further steps of:

detecting various driver command ranges, while evaluating the transmission ratio if necessary, on the basis of the detected driver command when an operating range is present which is suitable for monitoring;

reading out a maximum possible load value for each driver command; and, comparing the actual load value to said maximum possible load value.

6. The method of claim 1, wherein said signal representing engine load is the signal of a sensor measuring air mass, air quantity or intake-pipe underpressure.

7. The method of claim 1, further comprising the steps of:

initiating countermeasures when reaching or exceeding the maximum load value, said countermeasures including: switching off the output stage for the power-determining element, switching off fuel above an rpm threshold, switching off a road-speed limit or an rpm limit or the like; and, initiating display for diagnostic purposes.

8. An arrangement for controlling an internal combustion engine having a power-determining element, the arrangement comprising:

means for detecting a driver command;

means for controlling the engine power by adjusting said power-determining element on the basis of said driver command;

means for forming a signal representative of the engine load and for determining the metering of fuel to the engine;

monitoring means for monitoring the control function; and, said monitoring means including means for detecting at least one driver command range on the basis of the detected driver command; means for determining a maximum value for said signal for said one driver command range; and, means for initiating fault and/or emergency measures when said signal value reaches or exceeds said maximum value.

9. The arrangement of claim 8, further comprising:

a first computer element which adjusts said power-determining element on the basis of said driver command;

a second computer element for carrying out the monitoring measures which detects said driver command separately from said first computer element;

a third computer element for metering fuel to the engine; and, an interface connected to said third computer element and being provided to transmit said signal to said second computer element.

10. The arrangement of claim 8, further comprising:

a first computing element for adjusting said power determining element on the basis of said driver command; and, a second computing element for carrying out the monitoring and the metering of fuel.

11. The arrangement of claim 8, further comprising:

a first computing element for adjusting the metering of fuel and for adjusting the power determining element on the basis of said driver command; and, a second computing element for carrying out said monitoring.

* * * * *